May 7, 1968   W. R. MILLER   3,381,953
PORTABLE AUTOMOTIVE EQUIPMENT SUPPORT
Filed March 9, 1966
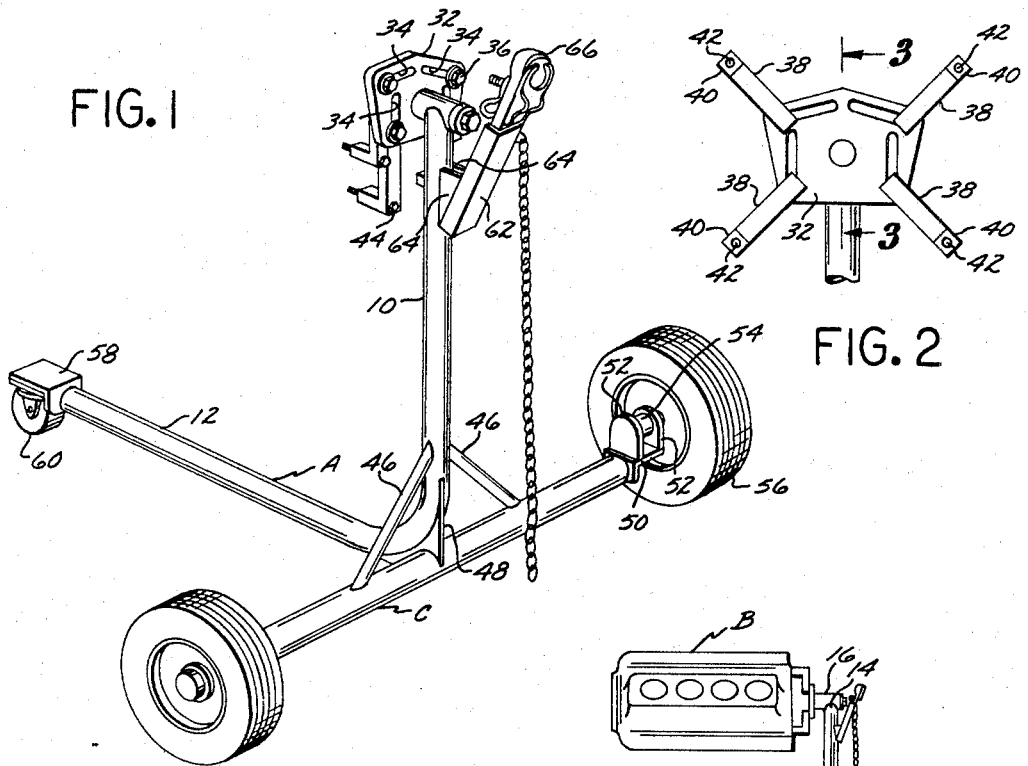
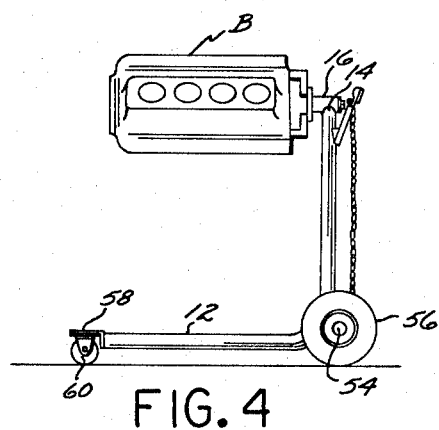
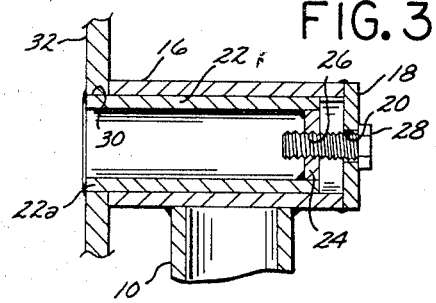
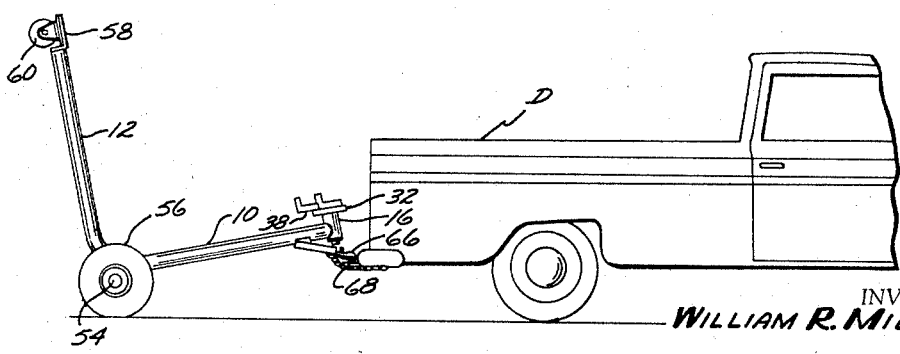
INVENTOR.
WILLIAM R. MILLER
BY
William C. Babcock
ATTORNEY

United States Patent Office 3,381,953
Patented May 7, 1968

3,381,953
PORTABLE AUTOMOTIVE EQUIPMENT SUPPORT
William R. Miller, 11916 Susan Ave.,
Downey, Calif. 90242
Filed Mar. 9, 1966, Ser. No. 533,053
2 Claims. (Cl. 269—17)

The present invention relates generally to the field of automotive accessories, and more particularly to a portable device, which when in a first position will support an automotive engine, automatic transmission, or the like, at a desired elevation above the ground surface, and when in a second position can be towed from place to place behind a power vehicle equipped with a first portion of a trailer hitch mounted on the rear thereof.

In the automotive repair field it is frequently necessary to support an engine, automotive transmission, or the like, in an elevated position and so adjustably rotate the same on the longitudinal axis thereof that work can be conveniently performed thereon. Heretofore no support has been available which is adapted to perform such functions, and yet which may be towed from one location to another behind a power vehicle.

A major object of the present invention is to provide a device, which when in a first position provides a stable support for an automotive engine, automotive transmission, or the like, and so supported that it is possible to rotate the same on the longitudinal axis thereof to a position where it is convenient to perform work or make a visual inspection thereof.

Another object of the invention is to provide an engine support that may be disposed in a second position wherein it is possible to tow it from place to place behind a power vehicle equipped with a first portion of a trailer hitch mounted on the rear thereof.

Another object of the invention is to supply an engine or transmission supporting device of simple mechanical structure which is easy to use, can be fabricated from standard, commercially available materials, requires little or no maintenance attention, and can be retailed at a sufficiently low price as to encourage the widespread use thereof.

A still further object of the invention is to furnish a device, which when in a first position adjustably supports an engine or transmission in any desired rotational position relative to the longitudinal axis thereof and at a sufficiently elevated position above the ground surface to permit work to be conveniently performed thereon or inspection thereof.

Yet a further object of the invention is to provide a support for an engine or transmission which permits the engine or transmission to be adjustably rotated relative to the longitudinal axis thereof by loosening a single bolt, and when the engine or transmission has been rotated to a desired orientation it may be so held by simply tightening said bolt.

These and other objects and advantages of the invention will become apparent from the following description of a preferred form thereof, and from the accompanying drawing illustrating the same, in which:

FIGURE 1 is a perspective view of the support of the present invention when in a first position;

FIGURE 2 is a rear elevational view of the upper portion of the support which has been adjusted to engage spaced tapped bores in the end portions of an engine or transmission;

FIGURE 3 is an enlarged fragmentary vertical cross-sectional view of a portion of the support shown in FIGURE 2, taken on the line 3—3 thereof;

FIGURE 4 is a side elevational view of the device when in a first position and removably supporting an engine block in an elevated position above the ground surface; and FIGURE 5 is a side elevational view of the support when in a second position wherein it is possible to tow the same from one location to another behind a power vehicle.

With continued reference to the drawing for the general arrangement of the invention, it will be seen in FIGURE 1 to include an L-shaped tubular member A provided with a first leg 10 and a second leg 12 which are in a substantially 90° relationship. The upper portion 14 of leg 10 supports a short tube 16 that is parallel to the second leg 12 and extends forwardly and rearwardly from the first leg. The forward end of the tube 16 is closed by a first end piece 18 that is welded or otherwise secured thereto. A centrally disposed first bore 20 is formed in end piece 18.

A second tube 22 is slidably and rotatably supported within the confines of the first tube 16. The forward end of tube 22 is closed by a second end piece 24 in which a centrally disposed tapped bore 26 is formed. A bolt 28 projects through bore 20 and threadedly engages bore 26. A rear end portion 22a of second tube 22 extends rearwardly beyond the first tube 16 to engage an opening 30 formed in a heavy plate 32 positioned parallel to first leg 10 and rearwardly thereof.

A number of spaced slots 34 are formed in plate 32, with a portion of these slots being disposed substantially vertically when the support is in the first position shown in FIGURE 1, and the balance of the slots lying in a slightly angular plane relative to the horizontal. A bolt 36 extends through each of the slots 34 to engage a tapped bore (not shown) in one of a number of L-shaped engine-supporting members 38 shown in FIGURES 1 and 2. Each engine-supporting member 38 has a leg 40 that is parallel to the second leg 12. A longitudinally extending bore 42 is formed in each leg 40 in which a bolt 44 is rotatably supported, with each bolt being sufficiently long to project rearwardly beyond the leg 40 to engage one of the tapped bores (not shown) formed in the forward portion of an engine B, as may be seen in FIGURE 4.

The bolts 36 remain loose until the L-shaped members 38 have been adjusted to positions where the bolts 44 can engage the tapped bores (not shown) in the engine B, but after these bolts have been screwed into these bores, they are tightened to hold the L-shaped members in fixed positions relative to the plate 32, as illustrated in FIGURE 2. After the engine B has been secured to the L-shaped members 38 in the manner described, the engine can be rotated about its longitudinal axis by loosening the bolt 28, and when the engine has been rotated to a desired position it can be so held relative to the support by tightening the bolt 28.

During tightening of bolt 28, the second tube 22 is moved forwardly to urge the forward face of the plate 32 into frictional contact with the rear edge of the first tube 16 with sufficient force to hold the plate 32 in a non-rotatable position relative to the member A, as is the engine B secured to the plate by the L-shaped member 38.

The support further includes a transverse shaft C (FIGURE 1), the central portion of which is disposed adjacent the innermost portions of the legs 10 and 12, and secured to the member A by angularly disposed reinforcing members 46 and a gusset plate 48. Inverted L-shaped members 50 are secured to the ends of shaft C, and from which members two laterally spaced lugs 52 project upwardly. The lugs 52 serve to support a short stub shaft 54 on which a pneumatic tired wheel 56 is rotatably mounted.

An inverted L-shaped member 58 is secured to the rear end of the second leg 12, and a roller 60 of conventional design is rotatably supported therefrom. In addition to supporting the first tube 16 and elements associated therewith on the upper end thereof, the first leg 10 also serves as a support for an upwardly and forwardly extending rigid member 62 that is secured to leg 10 by two laterally spaced triangular plates 64, as best seen in FIGURE 1. The free end of member 62 supports a second portion 66 of a trailer hitch that is adapted to removably engage a first hitch portion 68 secured to the rear of a power vehicle D, such as a truck, or the like.

When the first hitch portion 68 and second portion 66 are placed in engagement, as seen in FIGURE 5, the support is disposed in a second position where it can be drawn from one location to another behind the power vehicle D for use in removably supporting an engine B, transmission, or the like, after the destination is reached and the support has been returned to the first position shown in FIGURES 1 and 4.

The use and operation of the invention have been previously described in detail and need not be repeated.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:

1. A device adapted to be disposed in either a first position where it supports an automobile engine in which a plurality of spaced tapped bores are formed in either the front or rear portions thereof at a desired elevation above the ground, or in a second position where said device can be towed by a power vehicle equipped with a first portion of a trailer hitch on the rear thereof, which device includes:
   (a) a heavy L-shaped member provided with first and second legs, each of which have free end portions;
   (b) a short tube rigidly affixed to the first free end portion of said first leg, with said tube being substantially parallel to said second leg;
   (c) a first end piece rigidly secured to the end of said first tube forwardly of said first leg, in which first end piece a centrally disposed transverse first bore is formed;
   (d) a second tube slidably and rotatably supported in said first tube;
   (e) a second end piece that closes that end of said second tube most adjacent said first end piece, in which second end piece a tapped second bore is formed that is in longitudinal alignment with said first bore;
   (f) a plate rigidly secured to a second end portion of said second tube and disposed above said second legs;
   (g) first means adjustably supported from said plate for engaging said tapped bores in said engine to removably support said engine from said plate;
   (h) a bolt extending through said first bore that threadedly engages said tapped second bore, which bolt when tightened moves said second tube and plate towards said first end piece until said plate is in frictional pressure contact with the rear end of said first tube with sufficient force to maintain said plate and engine in a desired non-rotatable position relative to said first leg;
   (i) a transverse shaft secured to said L-shaped member at substantially the intersection of said first and second legs;
   (j) two pneumatic tired wheels rotatably supported from the end portions of said shaft;
   (k) a roller rotatably supported from the free end of said second leg;
   (l) a rigid member secured to said first leg adjacent said free end thereof, which member extends away from said second leg; and
   (m) a second trailer hitch portion supported from the forward end of said member, which hitch portion is adapted to removably engage said first portion of said trailer hitch, said first leg when said device is in said first position serving to support said engine at a desired elevation above the surface on which said wheels and roller rest, with said first leg when said device is in said second position cooperating with said member and said second hitch portion to permit said device to be drawn from one location to another by said power vehicle.

2. A device as defined in claim 1 which further includes:
   (n) a chain secured to said rigid member for engaging said first portion of said hitch.

References Cited

UNITED STATES PATENTS
2,654,147  10/1953  Wilson _____ 269—17 X

FOREIGN PATENTS
754,051  8/1956  Great Britain.

ROBERT C. RIORDON, *Primary Examiner.*

D. R. MELTON, *Assistant Examiner.*